(12) United States Patent
Desmet

(10) Patent No.: US 8,285,520 B2
(45) Date of Patent: Oct. 9, 2012

(54) HAND HELD DATA COLLECTOR AND ANALYZER DEVICE

(76) Inventor: Ken Desmet, Tildonk (BE)

( * ) Notice: Subject to any disclaimer, the term of this patent is extended or adjusted under 35 U.S.C. 154(b) by 228 days.

(21) Appl. No.: 12/742,669

(22) PCT Filed: Nov. 28, 2007

(86) PCT No.: PCT/EP2007/010319
§ 371 (c)(1), (2), (4) Date: May 13, 2010

(87) PCT Pub. No.: WO2009/068052
PCT Pub. Date: Jun. 4, 2009

(65) Prior Publication Data
US 2010/0256956 A1   Oct. 7, 2010

(51) Int. Cl.
*H03F 1/26* (2006.01)
*H04B 15/00* (2006.01)

(52) U.S. Cl. ......... 702/190; 702/189; 702/191; 702/193
(58) Field of Classification Search .................. 702/104, 702/107, 121–123, 182–194
See application file for complete search history.

(56) References Cited

U.S. PATENT DOCUMENTS

| | | | |
|---|---|---|---|
| 4,885,707 A | 12/1989 | Nichol | |
| 5,847,658 A * | 12/1998 | Irie et al. | 340/683 |
| 5,870,699 A * | 2/1999 | Canada et al. | 702/190 |
| 5,992,237 A | 11/1999 | McCarty | |
| 6,189,384 B1 | 2/2001 | Piety | |
| 2005/0060123 A1 | 3/2005 | Schlitz | |

FOREIGN PATENT DOCUMENTS

| | | |
|---|---|---|
| EP | 0758740 A | 2/1997 |
| GB | 2355796 A | 5/2001 |
| WO | WO-03038390 A | 5/2003 |

OTHER PUBLICATIONS

An Overview of IEEE 1451.4 Transducer Electronic Data Sheets (TEDS) National Instruments (http://standards.ieee.org/regauth/1451/IEEE_1451d4_Templates_Tutorial_061804.pdf).

* cited by examiner

*Primary Examiner* — Phuong Huynh

(57) ABSTRACT

Data collector and analyzer hand held device capable of collecting and analyzing AC analog signals obtained by both converting pressure waves in the ultrasonic or in the vibration bandwidths into such signals comprising a conditioning circuit comprising a transducer identification circuit arranged for downloading a characteristic of an external transducer and at least a first amplifier, arranged for conditioning an AC analog signal at a desired amplitude, a first analog to digital converter, a digital signal processing unit, a central processing unit and a user interface. The first amplifier of the conditioning circuit is a multi-stage programmable amplifier arranged for enabling the adjustment of its gain between 0 and a predetermined value by the central processing unit as a function of a characteristic of an AC external transducer, downloaded by the identification circuit, transmitted by this circuit to the central processing unit and identified by this unit or of a known characteristic of an AC internal transducer.

19 Claims, 2 Drawing Sheets

HAND HELD DATA COLLECTOR AND ANALYZER DEVICE

CLAIM OF PRIORITY

This application is a national stage application which claims priority from a PCT application PCT/EP2007/010319 titled "Hand held data collector and analyzer device" filed on 28 Nov. 2007.

BACKGROUND OF INVENTION

1. Field of the Invention

The present invention relates to hand held data collector and analyzer devices and particularly to devices capable of collecting and analyzing vibration and/or ultrasonic data.

2. Background and Description of the Related Art

Hand held data collector and analyzer devices are generally used to collect vibration or ultrasonic data from machines or systems for use in predicting maintenance applications. Such data collectors and analyzers may be programmed to be loaded with a route from a central computer, and such route may include a list of machines, test points, and a set-up conditions for each test point. Typical routes comprise dozens of machines or systems to be checked in the route with dozens of test points on each machine or system, and for each test point there may be specified a frequency range to be analyzed, a type of analysis to be performed, a particular type or set of data to be stored, and similar other parameters. Based on inputs from the user, the hand held instrument prompts the user as to the identity of the machine and the test point to be monitored, and it automatically sets up the instrument, for example, to record a predetermined frequency range for the test point, conduct a predetermined analysis and store a predetermined set of data. Data are thus collected along the route and then transferred to the central computer for storage and subsequent treatment.

These hand held devices are in industrial environments exposed to a large range of vibrations, temperatures, pressures etc. . . . and must however remain capable of monitoring vibration or ultrasonic sources accurately in those conditions.

For example, to distinguish a click associated with a crack in a bearing, a user will usually select a frequency range of interest and look for a specific frequency that may indicate a cracked bearing.

Typical known data collector and analyzer devices use an analog signal processing unit comprising an analog filter element to remove some of the unwanted frequency components and then shift the signal frequency range in an appropriate bandwidth, such as in the audible frequencies. Such a filter element usually comprises a mixer element arranged for mixing the amplified analog signal with a square wave signal and a filtering element receiving the mixed signal and removing the unwanted portion of this signal, these mixing and filtering operations leading to the above shifting of the signal frequency range. One approach to achieve the frequency analysis capability has been to introduce in the analog signal processing unit a programmable analog low-pass filter (LPF) whose cutoff frequency can be controlled for selecting the frequency range that needs to be analysed. The output of the filter is then sampled by an analog-digital converter (ADC) to provide a digital signal that is operated on by a digital signal processing unit.

Such devices do however suffers from inconveniencies. Namely, programmable analog low-pass filters such as anti-aliasing filters, will produce a certain amount of distortion of amplitude, frequency and phase that may be critical in certain applications.

Limitations at the higher end of the frequency range appear in such prior art devices but some instruments are also unstable at low frequencies. This characteristic usually results from circuit designs focused on certain preferred frequency ranges because such frequencies are generally of greater interest.

On the other hand, digital programmable low-pass filters can be rendered much more stable.

An example of devices comprising programmable analog low-pass filters is described in U.S. Pat. No. 6,189,384, which relates to a route-base ultrasonic monitoring device, capable of collecting and analysing signals in the ultrasonic bandwidth and possibly also temperature (infra-red) signals.

It has been proposed to overcome the above problems of distortion of the signal arising with analog filters by providing hand held data collectors and analyzers with a digital signal processing unit comprising digital filters instead of their analog counterparts for filtering the signal after it has been digitalised, ie sampled, by the convertor. On the other hand, digital low pass filters enable a very low level of distortion of the signal and are much more easy to parameterise since this is achieved by way of a software instead of hardware components. An example of a collecting and analysing hand held device of this kind is described by U.S. Pat. No. 5,870,699. The described device however is solely capable of collecting and analysing signals in the vibration bandwidth. Another more recent prior art device solely capable of collecting and analyzing signals in the vibration bandwidth is described in U.S. patent application no. 2005/0060123.

Prior art devices thus do not combine digital shifting and possibility of collecting and analysing signals in both the ultrasonic and vibration bandwidths.

SUMMARY

This and other drawbacks of prior art hand held data collectors and analyzers is addressed and solved by the present invention, which provides a data collector and analyser hand held device capable of collecting and analysing AC analog signals obtained by both converting pressure waves in the ultrasonic or in the vibration bandwidths into such signals by an AC transducer either internal and comprised in the device or external and connected to said device, comprising a conditioning circuit comprising a transducer identification circuit arranged for downloading a characteristic of an external transducer and at least a first amplifier arranged for conditioning an AC analog signal at a desired amplitude, a first analog to digital converter arranged for receiving and sampling the conditioned AC analog signal and connected to the said first amplifier, a digital signal processing unit arranged for processing a digital signal to produce desired digital data, a central processing unit connected to the digital signal processing unit and to the conditioning circuit for controlling their respective operations, a user interface connected to the central processing unit and comprising user input and output means, and a data logger connected to the digital signal processing unit and arranged for recording said desired digital data. The device is characterised in that the first amplifier of the conditioning circuit is a multi-stage programmable amplifier arranged for enabling the adjustment of its gain between 0 and a predetermined value by the central processing unit as a function of a characteristic of an AC external transducer, downloaded by the identification circuit, transmitted by this circuit to the central processing unit and identified by this unit or of a known characteristic of an AC internal transducer if the device comprises such an internal AC transducer.

Thanks to the fact that the first amplifier of the conditioning circuit of the hand held data collector and analyzer according to the invention is a multi-stage programmable amplifier arranged for enabling the adjustment of its gain between 0 and a predetermined value by the central processing unit, this device is capable of collecting and analysing AC analog signals obtained by converting pressure waves both in the ultrasonic and in the vibration bandwidth and processing them integrally in a digitized form in its digital signal processing unit after the conditioned signals have been digitized by the first analog to digital converter.

This renders the device according to the invention both remarkably polyvalent thanks to its capacity to collect and analyze signals in both the ultrasonic and vibration bandwidths and extremely precise thanks to its capacity to process these signals once they have been digitized.

BRIEF DESCRIPTION OF THE DRAWINGS

The invention will now be described through a non-limitative embodiment, with reference to the enclosed figures, in which.

DETAILED DESCRIPTION

Figure 1:
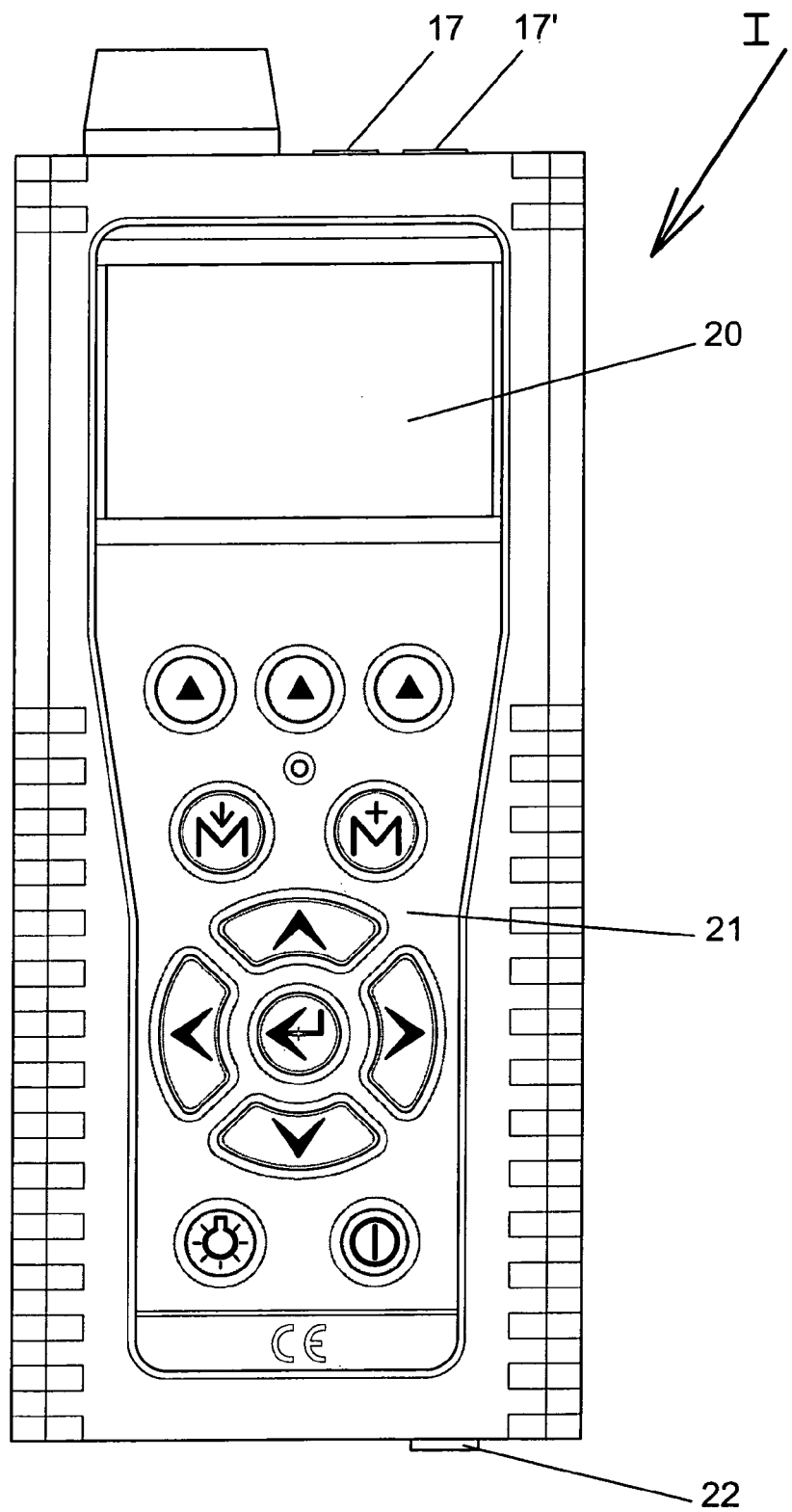
FIG. 1 is a schematic representation of the external appearance of a device according to the invention.

Referring to the figures, in which like reference characters designate like or corresponding parts throughout the different views, there is shown in FIG. 1 a hand held data collector and analyzer I capable of collecting and analysing AC analog signals obtained by both converting pressure waves in the ultrasonic or in the vibration bandwidths into such signals by AC transducers and capable of collecting and analyzing DC analog signals obtained by converting non pressure waves into such signals by DC transducers. The analyzer I includes a keyboard 21 disposed on the face of the analyzer adjacent to a display 20. Control of the analyzer I is achieved through the keyboard 21 in combination with the display 20. In a typical operation, set-up conditions for a number of machines are downloaded into the analyzer I from an external host computer through a connecting unit 22 of the analyzer I. Transducer connectors 17, 17' provide input channels for receiving signals from external transducers. Using the keyboard 21 and the display 20, the operator may cause the analyzer I to incrementally step through the downloaded route of machines, or may invoke independent analyzer functions that are totally independent of the route.

Figure 2:
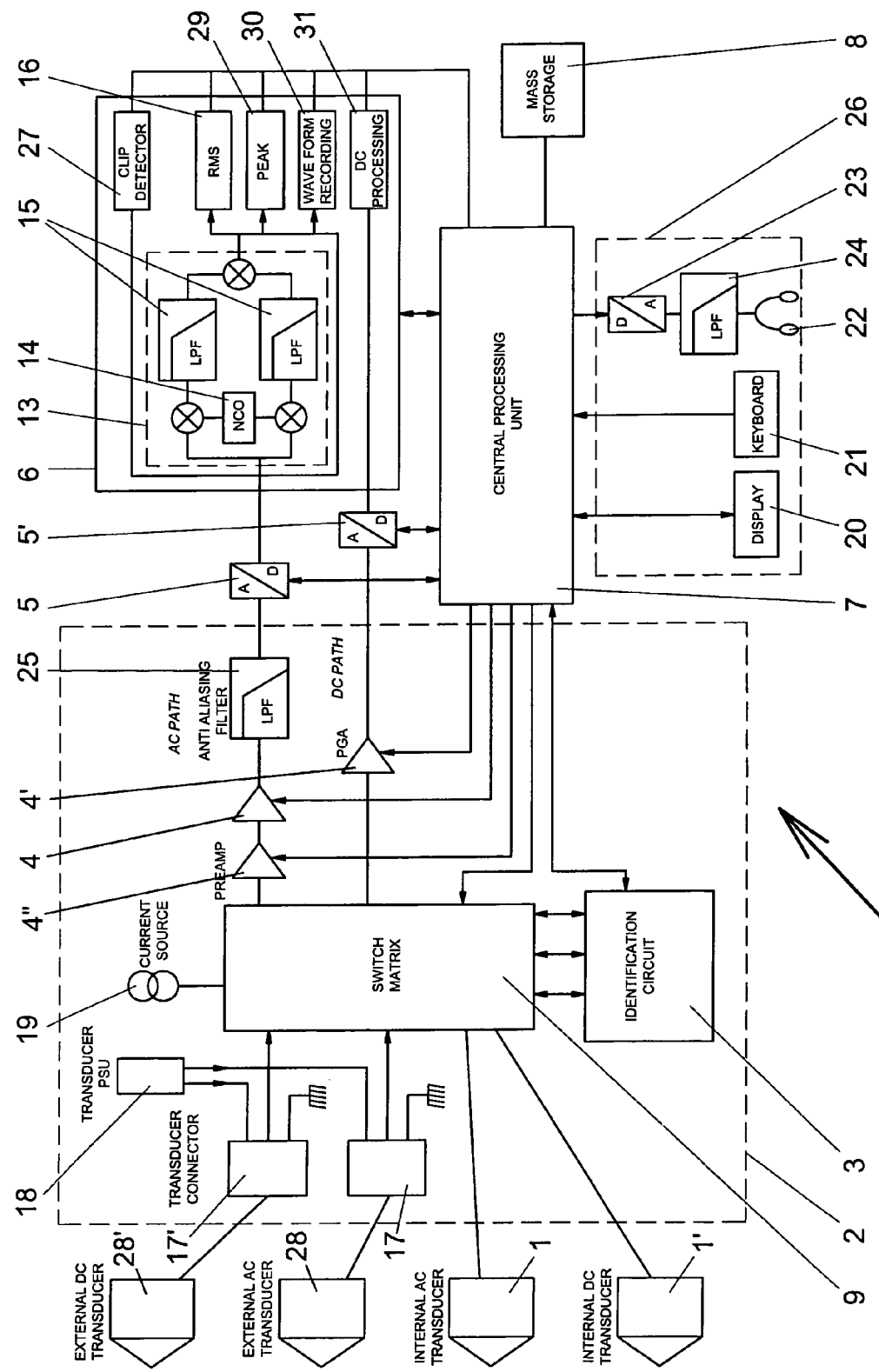
FIG. 2 is a simplified block diagram of the principal components of the device of FIG. 1.

With reference to FIG. 2, the principal components of the hand held data collector and analyzer of FIG. 1 are illustrated in a simplified block diagram. The illustrated data collector and analyser hand held device I comprises an internal transducer 1 arranged for converting pressure waves into an AC analog signal, an internal transducer 1' arranged for converting non-pressure waves into a DC analog signal, a transducer connector 17 arranged for connecting to the device an external AC transducer 28 arranged for converting pressure waves into an AC analog signal and a transducer connector 17' arranged for connecting an external DC transducer 28' arranged for converting non pressure waves into a DC analog signal. Alternatively, the device may comprise no internal AC transducer or a plurality of such transducers and/or may comprise no internal DC transducer or a plurality of such transducers. Similarly, the device may comprise no transducer connector for connecting an external AC transducer or a plurality of such connectors and/or may comprise no transducer connector for connecting an external DC transducer or a plurality of such connectors.

The illustrated device further comprises a conditioning circuit 2 connected to each internal transducer and to each transducer connector and arranged for receiving and conditioning an analog signal produced by a transducer This conditioning circuit comprises a transducer identification circuit 3 arranged for downloading a characteristic of an external transducer (and alternatively also of an internal transducer), a first 4 and a second 4' amplifier, being respectively arranged for conditioning an AC and a DC analog signal at a desired amplitude.

The identification circuit is arranged for determining whether an external transducer is actually connected to the device. If so, when this transducer has been identified, the internal transducer can be switched on or off by means of semiconductor switches (not represented) under software control of a central processing unit 7.

The first amplifier is a multi-stage programmable amplifier arranged for enabling the adjustment by the central processing unit of the device of its gain between 0 and a predetermined value, as a function of a characteristic of an AC external transducer, downloaded by the identification circuit, transmitted by this circuit to the central processing unit and identified by this unit or as a function of a known (for example stored in the central processing unit) characteristic of an AC internal transducer. The second amplifier is a single stage programmable amplifier (alternatively, a multistage amplifier may also be used as the second amplifier) also arranged for enabling the adjustment of its gain between 0 and a predetermined value by the central processing unit as a function of a characteristic of an external DC transducer, downloaded by the identification circuit, transmitted by this circuit to the central processing unit and identified by this unit or of a known characteristic of an internal DC transducer. This second programmable amplifier has both single ended (one signal) and differential (two signals with a 180° diphase) input capabilities. In single ended mode, the amplifier can be selected to process one of two differential inputs. In differential mode, the difference of the two inputs will be amplified.

The first and second amplifiers are respectively connected to a first and a second analog to digital converter (ADC) 5, 5' respectively arranged for receiving and sampling a conditioned AC and DC analog signal. A 16-bit 256 kSPS (kilo samples per second) or higher ADC is generally used to digitize an AC signal. The second ADC is also a minimum 16-bit one.

The above mentioned characteristic of a transducer that can be downloaded by the transducer identification circuit may either be a transducer internal resistance value or a transducer set of functioning parameters or a transducer electronic data sheet (TEDS, as described in IEEE document no. 1451.4). A software loaded on an on board microprocessor (not represented) of the central processing unit is arranged for identifying a transducer through those possible characteristics. The first kind of characteristic is for simple transducers, through the measurement of the value of a resistance of the transducer. Different resistance values correspond to different specific transducers. The second more complex kind of identification characteristic is a set of functioning parameters held by transducers and that can be downloaded to the central processing unit by the transducer identification circuit through integrated circuit-to-integrated circuit (IIC) type of communication. The third kind of identification characteristic, a TEDS, is advantageous because it uses only one wire both for powering the transducer, powering a TEDS memory function inside the transducer, communicate with this TEDS memory function and retrieve the transducer signal. With this type of transducer, a reference number of the transducer downloaded to the central processor unit is used for indexing a table gathering the parameters of this transducer corresponding to said reference number.

Different kinds of transducers can be connected to the device or comprised in this device. Transducers for collection of pressure waves comprise ultrasound transducers (contact or non contact types), vibration transducer, namely accelerometers, run per minute (RPM) transducers (contact and non contact types) and transducer for collection of non pressure waves comprise temperature transducers (contact and non contact types), light intensity transducer, gas flow transducers (Mass Flow Transducers), gas transducers (TGS or GasFET types), and pH transducers. For enabling certain transducers to function (certain ultrasound transducers functioning with build in pre amplifier, accelerometers, RPM transducers, mass flow transducers, gas transducers, etc), the conditioning circuit comprises a power source unit (PSU) 18. The conditioning circuit further comprises a current source unit 19 for powering the device.

In leak detection applications and mechanical wear detection applications, piezoelectric transducers are used to convert small ultrasound vibrations into AC electrical signals. These transducers give off very low voltage levels (typically a few microvolts). In such ultrasound applications, the conditioning circuit must convert the transducer signal to more easily manageable voltage levels, which requires both high amplification gain and very low noise of the first multi-stage amplifier. Therefore, this amplifier comprises three stages of amplification that together have a gain range from 0 to a predetermined value, e.g. 90 dB. Three stages are used in order to be able to appropriately control both noise, frequency range and total gain of the amplifier, which is not achievable with a single stage amplifier. The for example total 90 dB amplification is equally divided over the three stages. The first amplifier stage is actually a pre-amplifier 4" and is build as a non inverting ultra low noise operational amplifier. The gain of this first amplifier stage can be set to either buffer (0 dB) amplification or 30 dB of amplification. The amplifier's gain can be selected under software control by the central processing unit, e.g. through a CMOS switch (not represented). The second and third amplification stages are identical. They are build as two inverting low noise operational amplifiers. The gain of each operational amplifier stage is set by selecting a precision resistor out of a network, e.g. by means a CMOS switch (not represented) under software control by the central processing unit. In the above example of a total 90 dB amplification, the gain of the second and third stages of amplification can be set to 0, 10, 20 and 30 dB. The global amplification enabled by the three stages of the amplifier may thus be set up between 0 and 90 dB, with 10 dB steps. The optimal gain for a given transducer is determined namely either by the central processing unit, based on the transducer characteristic downloaded by the transducer identification circuit of the conditioning circuit, or by the user himself, as e.g. for ultrasonic transducers. Such three amplification stages allow low amplitude transducer signals inputs with signal levels up to 2V, like airborne ultrasound, contact ultrasound transducers and acoustic microphones for audible sound measurements. In case of vibration signals collected by accelerometers, the amplitudes can be much higher. Most phantom powered accelerometers can deliver amplitudes of up to 8V. To allow these high amplitudes into the conditioning circuit, the latter further comprises an AC attenuator (not represented), connected to the transducer connectors, to the internal AC transducer and to the first multi-stage programmable amplifier and arranged to be switched on or off and programmed by the central processing unit as a function of the characteristic of an external transducer connected to the device as identified by the central processing unit or of the known characteristic of the internal AC transducer. Optionally, a further DC attenuator (not represented) is also provided, connected to the transducer connectors and to the second programmable amplifier and arranged for being switched on or off, for assessing in its on position if the bias voltage of an accelerometer connected to the device is accurate.

The conditioning circuit further comprises a switch matrix 9 connected to the transducer identification circuit, to each amplifier of the circuit as well as to each internal transducer and each external transducer connector and arranged for routing a signal received from an external transducer to the transducer identification circuit and to the appropriate amplifier of the device and a signal received from an internal transducer to the appropriate amplifier of the device. Each transducer connector corresponds to a specific type of transducer being connectable to this device. As a function of the transducer connector through which a transducer is connected to the switch matrix and of the pins of the transducer that are effectively connected, the appropriate routing is set in the switch matrix, through a plurality of internal switches (not represented). The above mentioned AC and DC attenuators are usually provided in the switch matrix.

Once a transducer is identified by the central processing unit through the identification circuit, the central processing unit may then determine which path through the device components the signal received from a transducer needs to follow in order to process it (namely an AC or a DC path). The central processing unit is also then able to determine based on the transducer characteristic, whether or not it needs to be powered and if so, to activate the appropriate power source 18 connected to the transducer connectors of the device. Such path will be established through enabling and/or disabling and setting functional parameters of specific elements of the conditioning circuit and of the digital signal processing unit, by the central processing unit.

The conditioning circuit also comprises an anti aliasing low pass filter 25 connected to the output of the first multi-stage programmable amplifier and provided for preventing aliases formation when the conditioned signal is converted by the first ADC.

The hand held data collector and analyzer additionally comprises a digital signal processing unit 6 arranged for processing the digital signal for producing desired digital data, connected to the central processing unit, this unit being also connected to the conditioning circuit, for controlling by this central processing unit the operations of the digital signal processing unit and of the conditioning circuit. The digital signal processing unit is arranged for being able to simultaneously processing both AC and DC signals. This unit consists in the illustrated embodiment of the invention in a field programmable gate array (FPGA) arranged for performing a plurality of tasks simultaneously in parallel, into which the digital signal output by the first or second ADC is fed. Alternatively, this unit may comprise a plurality of such FPGA or consist in at least one digital signal processor (DSP) arranged for processing a signal through sequential processing operations. When a plurality of DSP are used, they may be arranged serially or in parallel.

The illustrated FPGA comprises a digital clip detector 27 arranged for detecting whether a digitized AC signal is of a value indicating that the conditioned signal had before its digitization an amplitude exceeding the conversion capacity of the ADC having digitized this signal and in this case for transmitting a corresponding signal to the central processing unit, enabling it to set the gain of the first multi-stage programmable amplifier or second programmable amplifier used for conditioning the signal to a value for which the amplitude of the conditioned signal is compatible with the conversion capacity of the considered ADC.

The digital clip detector is connected in the FPGA for processing AC digitized signals to a digital downshifting circuit 13 specifically used when ultrasonic signals are collected and analyzed by the device and which is provided with a bypass for avoiding its use when other types of signals are collected and analyzed, under the command of the central processing unit. This digital downshifting circuit uses digital down conversion (DDC) techniques frequently applied in modern communication technologies. It comprises a numerical control oscillator (NCO) 14 having both sin and cosine outputs and arranged to be set by the central processing unit to a predetermined number of Hz for shifting by that number a digitized signal. For example, for rendering audible by a human a 39.6 kHz signal emitted by a transducer this signal has to be shifted down by 38.4 kHz to make it a human audible 1.2 kHz tone. In this case the NCO is set at 38.4 kHz. A digitized AC signal fed to the FPGA is multiplied by both the sin and cosine outputs of the NCO. The digital downshifting circuit further comprises two digital programmable low pass filters 15 connected to each output of the NCO and whose length (ie the number of attenuation stages it comprises) and coefficients (ie parameters determining the cutting frequency of the filter) are arranged to be set by the central processing unit, for adjusting the bandwidth of the shifted digitized signal to a desired frequency range. Each low pass filter is in addition arranged for removing unwanted alias frequencies from the signal. A whole set of pre-calculated filter characteristics adapted to each type of signal to be collected and analyzed by the device are stored in the central processing unit and loaded to the low pass filters as appropriate to the considered signal. The outputs of both low pass filters are combined to make a single signal.

For processing AC digitized signals, the digital signal processing unit furthermore comprises a rectifying averaging circuit 16 arranged for determining the amplitude of an AC digitized signal. This circuit in the illustrated embodiment is a true root mean square (RMS) circuit. This circuit multiplies the amplitude of the individual samples of the digitized AC signal by themselves for obtaining a square function for rectifying the signal. Alternatively a digital absolute function can be used. The squared individual samples are then summed in a large accumulator (not represented) in the RMS circuit. The number of samples being summed in the accumulator corresponds to the averaging time constant, i.e. the measuring time, of the true RMS circuit. The output result of the accumulator is divided by the amount of samples accumulated and the result of this division is square rooted to obtain the RMS value. The squaring function and the accumulating function are ideally executed inside an FPGA as they are simple repetitive functions. The divide and square root functions may be performed in the FPGA but generally require large amounts of logic and therefore may alternatively be performed in the central processing unit.

Data output by the digital downshifting circuit may be sent under command by the central processing unit to a peak detector 29 arranged for determining the peak value of the signal data. These data may also be sent under command by the central processing unit to a wave form recording unit 30 arranged for storing them in a FIFO buffer memory (not represented). The FIFO buffer memory is then read by the central processing unit at its own tempo, for further processing of a signal by the latter, displaying on the display of the device and/or recording in a file system. The same data may be re-sampled if necessary to fit an audio digital to analog converter (DAC) 23 bit stream requirements. The analog signal output by the DAC is then passed through an operation amplifier based reconstruction low pass filter 24 to make it audible.

The digital signal processing unit further comprises a DC processing unit arranged for processing DC digitized signals.

A user interface 26 connected to the central processing unit and comprising user input and output means consisting in a keyboard 21, a display 20 and headphones 22, as well as a data logger 8 connected to the digital signal processing unit and to the central processing unit for recording a processed signal are also provided in the device, this data logger consisting in the illustrated embodiment in a mass storage unit external to the central processing unit but that alternatively might be internal to this unit.

What is claimed is:

1. Data collector and analyser hand held device capable of collecting and analysing AC analog signals obtained by both converting pressure waves in the ultrasonic or in the non-ultrasonic vibration bandwidths into such signals by an AC transducer either internal and comprised in the device or external and connected to said device, comprising:
   a conditioning circuit comprising a transducer identification circuit arranged for downloading a characteristic of an external transducer and at least a first amplifier, arranged for conditioning an AC analog signal at a desired amplitude,
   a first analog to digital converter arranged for receiving and sampling the conditioned AC analog signal and connected to the said first amplifier,
   a digital signal processing unit arranged for processing a digital signal to produce desired digital data,
   a central processing unit connected to the digital signal processing unit and to the conditioning circuit for controlling their respective operations,
   a user interface connected to the central processing unit and comprising user input and output means,
   wherein the first amplifier of the conditioning circuit is a multistage programmable amplifier arranged for enabling the adjustment of its gain between 0 and a predetermined value by the central processing unit 25 as a function of a characteristic of an AC external transducer, downloaded by the identification circuit, transmitted by the identification unit to the central processing unit and identified by the central processing unit or of a known characteristic of an AC internal transducer if the device comprises such an internal AC transducer.

2. Device according to claim 1, wherein the device is further capable of collecting and analysing DC analog signals obtained by converting non-pressure waves into such signals by a DC transducer either internal and comprised in the device or external and connected to the said device, the said conditioning circuit comprises a second programmable amplifier arranged for conditioning DC signals, the said second programmable amplifier being arranged for enabling the adjustment of its gain between 0 and a predetermined value by the central processing unit as a function of a characteristic of an external DC transducer, downloaded by the identification circuit and identified by the said central processing unit or of a known characteristic of an internal DC transducer if the device comprises such an internal DC transducer.

3. Device according to claim 1, wherein the device further comprises at least one internal AC transducer.

4. Device according to claim 2, wherein the device further comprises at least one DC internal transducer.

5. Device according to claim 1, wherein the device further comprises a data logger connected to the digital signal processing unit and arranged for recording the said desired digital data.

6. Device according to claim 5, wherein the said data logger further comprises a mass storage unit.

7. Device according to claim 1, wherein the conditioning circuit further comprises a switch matrix connected to the transducer identification circuit and to each amplifier of the circuit and arranged for routing a signal received from an external transducer to the transducer identification circuit.

8. Device according to claim 7, wherein the digital processing unit is arranged for being able to simultaneously processing both AC and DC signals.

9. Device according to claim 7 wherein the switch matrix comprises an AC attenuator connected to the first multi-stage programmable amplifier and arranged for being switched on or off and programmed by the central processing unit as a function of the characteristic of an external AC transducer as identified by said central processing unit or of a known characteristic of an internal AC transducer of the device if this device comprises such an internal transducer.

10. Device according to claim 1, wherein the first multi-stage programmable amplifier comprises three stages of amplification.

11. Device according to claim 1, wherein the digital signal processing unit comprises at least one digital signal processor (DSP) arranged for processing a digitized signal through sequential processing operations.

12. Device according to claim 11, wherein said digital signal processing unit comprises a plurality of DSP arranged serially or in parallel.

13. Device according to claim 1, wherein the digital signal processing unit comprises at least one field programmable gate array (FPGA) arranged for performing a plurality of tasks simultaneously in parallel.

14. Device according to claim 13, wherein in order to process AC digitized signals the digital signal processing unit further comprises a digital downshifting circuit comprising a numeric control oscillator arranged to be set by the central processing unit to a predetermined number of Hz for shifting by that number a digitized signal and at least one digital programmable low pass filter whose length and coefficients are arranged to be set by the central processing unit, for adjusting the bandwidth of the shifted digitized signal to a desired range.

15. Device according to claim 13, wherein in order to process AC digitized signal the digital signal processing unit further comprises a rectifying averaging circuit arranged for determining the amplitude of an AC digitized signal.

16. Device according to claim 15, wherein the rectifying averaging circuit is a true root mean square (RMS) circuit.

17. Device according to claim 2, wherein the digital signal processing unit further comprises a DC processing unit for processing DC digitized signals.

18. Device according to claim 11, wherein for processing AC digitized signals the digital signal processing unit further comprises a digital downshifting circuit comprising a numeric control oscillator arranged to be set by the central processing unit to a predetermined number of Hz for shifting by that number a digitized signal and at least one digital programmable low pass filter whose length and coefficients are arranged to be set by the central processing unit, for adjusting the bandwidth of the shifted digitized signal to a desired range.

19. Device according to claim 11, wherein for processing AC digitized signal the digital signal processing unit further comprises a rectifying averaging circuit arranged for determining the amplitude of an AC digitized signal.

* * * * *